(12) United States Patent
Stiblert et al.

(10) Patent No.: US 7,912,671 B2
(45) Date of Patent: Mar. 22, 2011

(54) METHOD FOR MEASURING THE POSITION OF A MARK IN A DEFLECTOR SYSTEM

(75) Inventors: Lars Stiblert, Göteborg (SE); Peter Ekberg, Lidingö (SE)

(73) Assignee: Micronic Laser Systems AB, Taby (SE)

( * ) Notice: Subject to any disclaimer, the term of this patent is extended or adjusted under 35 U.S.C. 154(b) by 575 days.

(21) Appl. No.: 10/587,482

(22) PCT Filed: Jan. 28, 2005

(86) PCT No.: PCT/SE2005/000100
§ 371 (c)(1), (2), (4) Date: Mar. 26, 2008

(87) PCT Pub. No.: WO2005/073668
PCT Pub. Date: Aug. 11, 2005

(65) Prior Publication Data
US 2008/0294367 A1 Nov. 27, 2008

Related U.S. Application Data

(60) Provisional application No. 60/540,141, filed on Jan. 29, 2004.

(51) Int. Cl.
G01B 7/00 (2006.01)
G06K 9/48 (2006.01)
(52) U.S. Cl. .................. 702/150; 702/155; 382/199
(58) Field of Classification Search .................. 702/150, 702/155; 382/199
See application file for complete search history.

(56) References Cited

U.S. PATENT DOCUMENTS

| 3,900,704 | A | * | 8/1975 | Thomas et al. | 348/170 |
|---|---|---|---|---|---|
| 4,301,470 | A | | 11/1981 | Pagany | |
| 4,459,021 | A | * | 7/1984 | Blazek | 356/71 |
| 4,629,313 | A | | 12/1986 | Tanimoto | |
| 4,866,783 | A | * | 9/1989 | Ohyama | 382/199 |
| 5,093,871 | A | * | 3/1992 | Klein et al. | 382/172 |
| 5,912,467 | A | | 6/1999 | Okino | |
| 6,031,225 | A | | 2/2000 | Stern et al. | |
| 2001/0016293 | A1 | | 8/2001 | Nishi et al. | |
| 2001/0055415 | A1 | | 12/2001 | Nozaki | |
| 2002/0006561 | A1 | | 1/2002 | Taniguchi | |
| 2003/0160195 | A1 | | 8/2003 | Kosugi | |

OTHER PUBLICATIONS

PCT International Search Report for International Application No. PCT/SE 2005/000100, mailed on Apr. 1, 2005.
1st page of International Preliminary Report on Patentability for International Application No. PCT/SE2005/000100 completed Jul. 31, 2006.

(Continued)

*Primary Examiner* — Eliseo Ramos Feliciano
*Assistant Examiner* — Janet L Suglo
(74) *Attorney, Agent, or Firm* — Haynes Beffel & Wolfeld LLP; Ernest J. Beffel, Jr.

(57) ABSTRACT

The present invention relates to a method for determining the coordinates of an arbitrarily shaped pattern in a deflector system. The method basically comprises the steps of: moving the pattern in a first direction (X), calculating the position of the edge of the pattern by counting the number of micro sweeps, performed in a perpendicular direction (Y), until the edge is detected, and determining the coordinates by relating the number of counted micro sweeps to the speed of the movement of the pattern. The invention also relates to software implementing the method.

14 Claims, 6 Drawing Sheets

OTHER PUBLICATIONS

Written Opinion of the International Searching Authority for International Application No. PCT/SE2005/000100 mailed on Jun. 7, 2005.

International Search Report, Appl No. SE2005/000591, mailed Dec. 5, 2005.

Written Opinion of the International Searching Authority for International Application PCT/SE/2005/000591, mailed Dec. 5, 2005.

Reply to Written Opinion of the International Searching Authority for International Application PCT/SE/2005/000591, filed Feb. 23, 2007.

* cited by examiner

METHOD FOR MEASURING THE POSITION OF A MARK IN A DEFLECTOR SYSTEM

TECHNICAL FIELD

The present invention relates to a method for determining the coordinates of an arbitrarily shaped pattern on a surface in a deflector system, as defined in claim 1 and 10. The invention also relates to software implementing the method for determining the coordinates of an arbitrarily shaped pattern on a surface in a deflector system, as defined in claim 14.

BACKGROUND TO THE INVENTION

The method used for measuring time in a deflector system has been used many years. Almost no modifications in the algorithm have been done so far. Only the pattern used for different kinds of calibrations has been modified during the years. Today we have an experimental verified repeatability of the method in the range of 10-15 nm over a surface of 800×800 mm. The 10-15 nm means here the measurement overlay.

One drawback of the method used is that we so far only can measure in the same direction as the micro sweep. In order to measure an X-coordinate we therefore must use special patterns containing 45-degree bars.

The method according to prior art is briefly described, since it is important to understand the present invention.

It is difficult to measure time with high accuracy. If, for example, you want to measure a pulse with the resolution of 1 nanosecond (ns) you need a measurement clock with the frequency of 1 GHz if classical frequency measurement methods are used. In the described prior art system, there is no need to measure a single shot of a pulse. The use a scanning beam while measuring will get several one-dimensional images of a bar or several bars, as an example. Only the "average" position of an edge or the CD of a bar is interesting. The measurement system will only give an average result together with its sigma. It is important to remember that the measurement system is good enough if this sigma is lower that the natural noise in the system. This natural noise can be summarized to be laser noise, electronically noise and mechanical noise. The noise from the measurement system itself can be calculated theoretically or verified in practice with a known reference signal. It is also possible to get a figure of the measurement system noise by simulation. The measurement of the position of the bar or the CD will therefore contain the error:

$$Error_{tot} = \sqrt{(Error_{natural})^2 + (Error_{measurement})^2}$$

When we measure time we use a so-called random phase method. What this means is that the measurement unit it-self is completely un-correlated in phase to the signal we want to measure. Due to the fact that the signal phase is random relative the measurement clock phase we can use a measurement clock frequency that is much lower and use an "averaging" effect instead to achieve the accuracy.

In FIG. 1 the measurement clock phase is shown relative the reference signal (SOS). Please note that the input signal (the bar) is synchronized with the reference signal since it is generated from the micro sweep itself. The upper row of clocks in FIG. 1 is the ruler marked in measuring clock increments. What we are after is where the positive going edge 10 of the input signal is relative our reference signal. Of course we also are interested of the negative going edge 11. But the same method may be used to find the position of any edge.

Let us call the period time of the measurement clock tm. Since the input signal is a result from the micro sweep we also know exactly the relationship between the pixel clock period in time and what that corresponds to in nanometers. Here we introduce tp for the pixel clock period in nanoseconds. We also call the pixel clock period in nanometers for pp. The scaling expression can therefore be expressed as:

$$pm(\text{nm}) = \frac{pp(\text{nm})}{tp(\text{ns})} \cdot tm(\text{ns})$$

pm is what each measurement clock period corresponds to in nanometers. From FIG. 1 we can see that the approximate position of the first edge, denoted 10, is 8 pixel clocks. Please note that by doing only one measurement i.e. using one of the six measurements 1-6 we can se that the edge is within the range of 8-10 measurement clocks. The accuracy is in other words 2*tm. Using above scaling expression this can be expressed in nanometers too.

In the following some realistic numbers are introduced.

$$tm=(1/40)=25 \text{ ns.}$$

$$tp=(1/46,7)=21.413 \text{ ns.}$$

$$pp=250 \text{ nm.}$$

This results in that the pm=291.86 nm.

If we now count measurement clock ticks by resetting a counter by the reference signal we see that we only will count 8 or 9 ticks. No other count is possible in this example. The edge position relative the phase of the measurement clock will in this way be rectangular distributed inside tm. The average position can therefore be calculated just by adding counts from several measurements together and divide this number with number of measurements. In this example we get (8+8+8+8+9+9)/6=8.33 counts as an average value. So an estimation of the position of the edge can be calculated to be:

$$8.33 \times 291.86 = 2432 \text{ nm.}$$

Now it is not enough just to use 6 measurements as in this example. Normally you use several thousands of measurements. (In the detailed description, the three sigma of the average value is described from a theoretical point of view.)

SUMMARY OF THE INVENTION

An object with the present invention is to provide a method for determining coordinates, especially in two dimensions, in a deflector system using any kind of pattern.

A solution is achieved in the features as defined in claim 1 and 10.

Another object with the present invention is also to provide software for performing the method, which is provided in the features defined in claim 14.

An advantage with the present invention is that it is possible to generate an image of the pattern without using any other detection method than the one we already are using today, since the present invention is similar to the prior art method, except that it is 90 degrees rotated.

Another advantage is that no new hardware is needed since the present invention is implemented in software.

DETAILED DESCRIPTION OF THE PREFERRED EMBODIMENTS

So far we only have used this method to measure along the micro sweep i.e. in one dimension. It is though possible to extend the method to measure in two dimensions. When we do this we actually are generating images of the pattern we measure.

When we talk about images we normally see this as a set of pixels. (Each pixel has a certain "gray-level" that describes the intensity of the pixel).

When handling CCD images each pixel is fixed in position in a certain raster (or grid). When analyzing a CCD image for finding the position of an edge both information of the pixel's location and gray-level must be used. Different straightforward methods may be used for estimating an edge position in the image. The accuracy of the position estimation depends in the calibration of the CCD array i.e. where the pixels are located in the array, how sensible they are for light and how well we can place the image on the array without any distortions. Light distribution over the CCD and different kinds of optical distortions will contribute to the error of the position estimation. A lot of these errors can be overcome if we calibrate the measurement system against a known reference.

When using the method according to the invention we also refer to pixels. But our pixels are not fixed in location in a certain grid. If we make a "snap shot" of the pattern by just measuring it once we will get information with a quite rough resolution (or accuracy). It is important to realize that the only information we are using is the pixels location. We do not use any gray-level information at all. Of course it is possible also to use gray-level information by recording the pattern using different "trig" levels in the hardware. This is what we do if we are interested in beam-shapes as in focus measurements. Here we only are interested in measuring the location of one or several bars so we can calculate center of gravity and CD.

When measuring registration and CD we never are interested in the exact location of one single pixel. Normally we only are interested in the average of several pixels location. In a CD measurement we use cursors to define number of pixels to be used in this average value. Also in the center of gravity estimation we use cursors to "even out" noise from the edge. This noise might be roughness from the pattern itself or noise in the measurement system. This is the same when using a CCD image as input.

In this suggested method we use the micro sweep itself as our light source (or ruler). It is hard to find a more accurate ruler than this. We already have methods to calibrate this ruler both in power and linearity very accurately.

Figure 2:
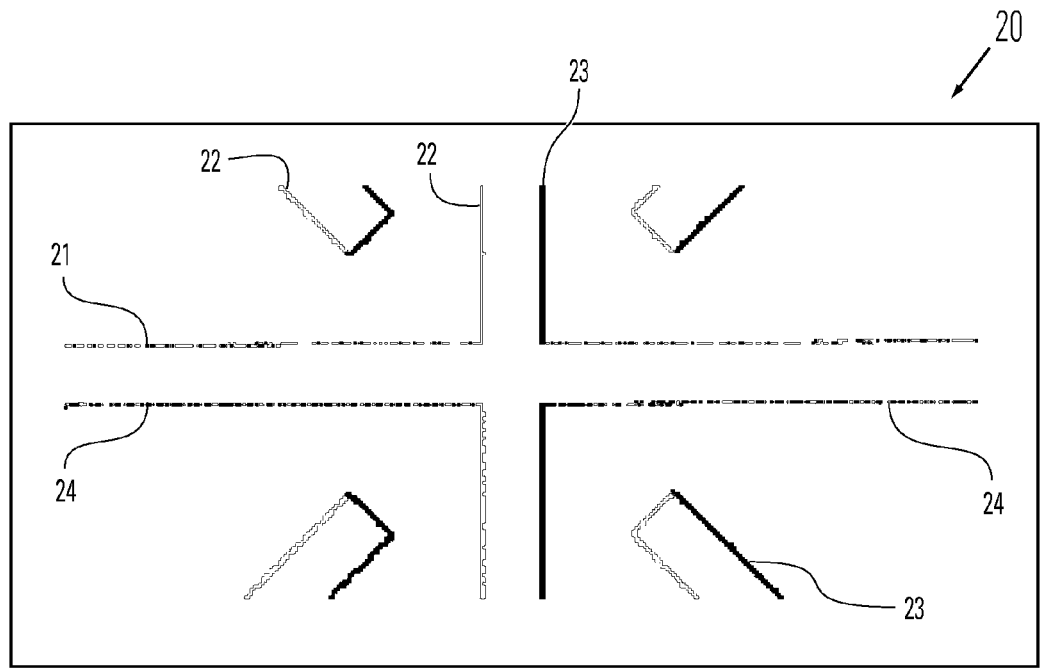
FIG. 2 shows an image of the star-mark that could be used for measuring time and position according to the invention.

In FIG. 2 we have captured an image 20 of a part of our star-mark. The image shows the location of pixels 21 in a grid of (316×250) nm. Nothing more than just showing the pixels in this grid has been done in the image. The image 20 shows so called events in the area. The mark has been scanned with a hardware cursor of 100 um. The positive going edges 22 are shown as white pixels and negative going edges 23 (chromeglass transitions) are shown as black pixels. Just by observing this image you can see that the mark is slightly rotated counter clock vice. The number of black pixels in the lower Y-parallel bars 24 compared to whites ones is a clear indication of this fact.

Figure 3:
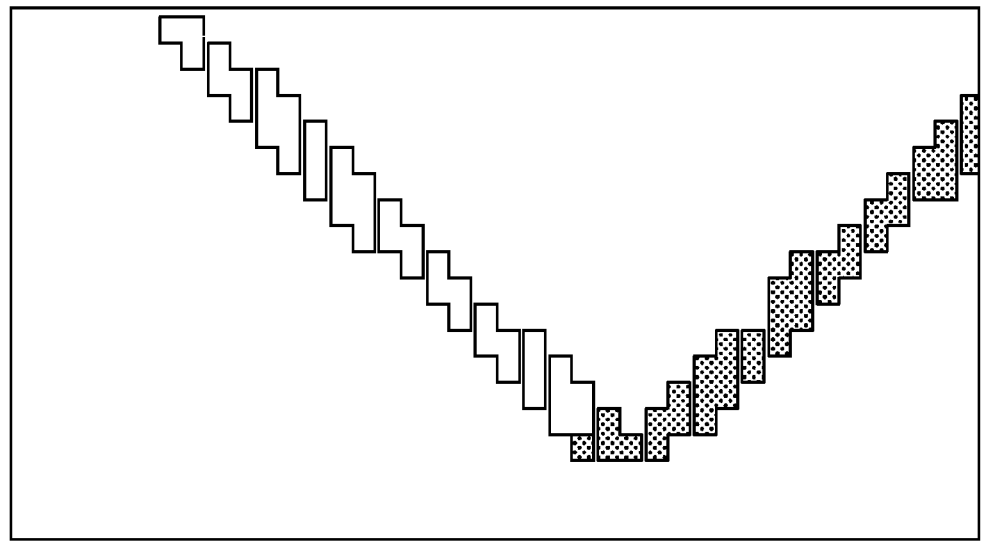
FIG. 3 shows an enlargement of a part of the image in FIG. 2.

In order to demonstrate the actual grid we are using and how the pixels are distributed in this grid we refer to FIG. 3.

Here we have enlarged a part of the image 20. This "hard copy" of the image shows clearly where we have found events. The method to "sharpen" up this image will be presented below. The scale in this image is correct in that sense that one pixel is 316 nm in X-direction (vertical scale) and 250 nm in Y-direction (horizontal scale).

Estimation of the X-Coordinate

As has been described in the background to the invention, there exists a very accurate method to estimate the Y-coordinate of an event. The micro sweep is used as a ruler and a measuring clock that is random in phase relative the ruler. The measurement clock will give us a rough resolution of tm (292 nm) in a single shot measurement. If we use several measurements and build us an average value we will get a much higher resolution (see below). Actually we can choose the accuracy just be selecting number of measurements and the length of the cursor to be used. So far this is true for the estimation of the Y-coordinate. The problem is how do we do to estimate the X-coordinate?

Obviously it is difficult to believe that it is possible to get an X-value out from data retrieved by a scanning a beam in Y-direction. The big step forwards is that it actually is possible to retrieve this information almost with the same accuracy as the Y-coordinate. But to get it we must introduce another signal (that actually already is used in the system), the lambda/2 X-signal.

In the prior art, when measuring a 45-degree bar of a pattern as in the star-mark case, we use the X-lambda/2 signal as "marks" in X-direction to define an X-cursor. Inside the cursor we also record the lambda/2 signal simultaneously when we count the measurement clocks. But since we measure on a 45-degree bar we actually are using only Y-information to get the X-coordinate. In combination with the lambda/2 information we can calculate the X-coordinate with a very high accuracy. The drawback of this method is of course that we are not able to measure on any kind of pattern. Especially we cannot measure on a bar that is parallel with the ruler. If we extend the method we already are using in Y-direction a little bit, we will soon realize that the problem to solve is exactly the same as we have in Y-direction but rotated 90 degrees. If we change our measurement clock to our reference signal (here the SOS—Start Of Sweep) and use the lambda/2 signal as reference instead we have rotated the problem 90 degrees.

When doing this "rotation" of the problem we need to re-calculate our parameters. In Y-direction our resolution was one measurement clock that corresponded to 292 nm. During one run over the pattern of interest we scanned it with a frequency of approximately 30 kHz. The question now is how far we move in X-direction between the scans. If we set the speed as low as possible we will retrieve about 8-10 scans of the pattern in each lambda/2 period. Since one lambda/2 period corresponds to 316 nm we have a resolution in the range of 30-40 nm in X-direction. This is because we scan the pattern with the frequency of 30 kHz during the movement in X-direction. Now when we use the lambda/2 signal as the reference we therefore have a "clock" with a spatial resolution of 30-40 nm in X-direction. This is significantly higher than the resolution in Y-direction. But, and this is important, we will not get as many samples in X-direction as in Y because of the movement in X. This fact is illustrated in FIG. 4.

Figure 4:
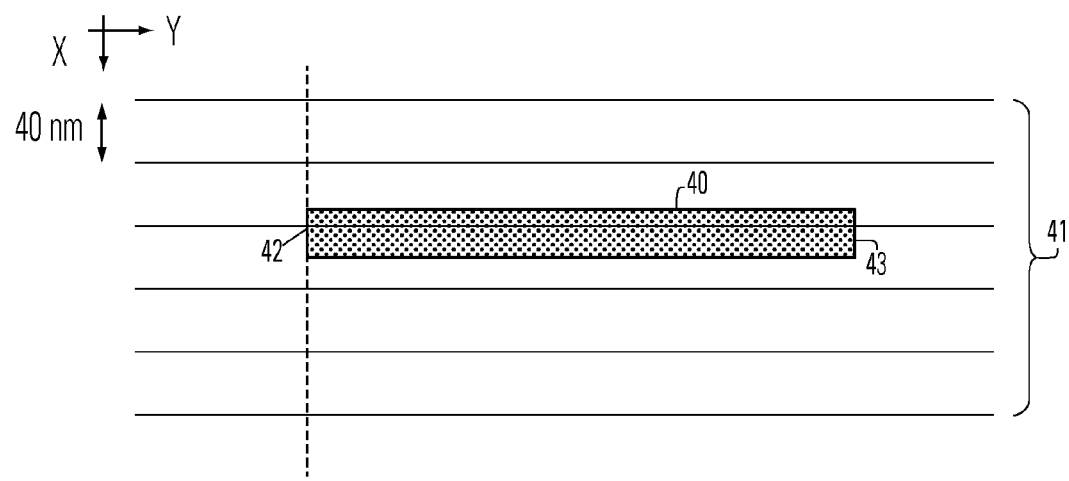
FIG. 4 illustrates the principal measuring technique of a horizontal bar according to the invention.

The situation in X-direction is shown in FIG. 4. A bar 40 is scanned in one stroke (run) and generates one event only in the six scans 41. So when moving over the bar one time we know the position of the bar with an accuracy of +/−40 nm in the X direction. The Y-coordinate of the bar location is known with the accuracy of +/−292 nm (in each of the two edges 42 and 43). In FIG. 4, the CD in X-direction of the bar is lower than the 40 nm measurement grid we use in X-direction. So just running one time over the pattern might miss the fact that there is a bar at all.

This is natural since the resolution is lower than the CD of the bar to be measured. In order to measure the bar with higher resolution you need to do several runs over the pattern with random phase.

Figure 5:
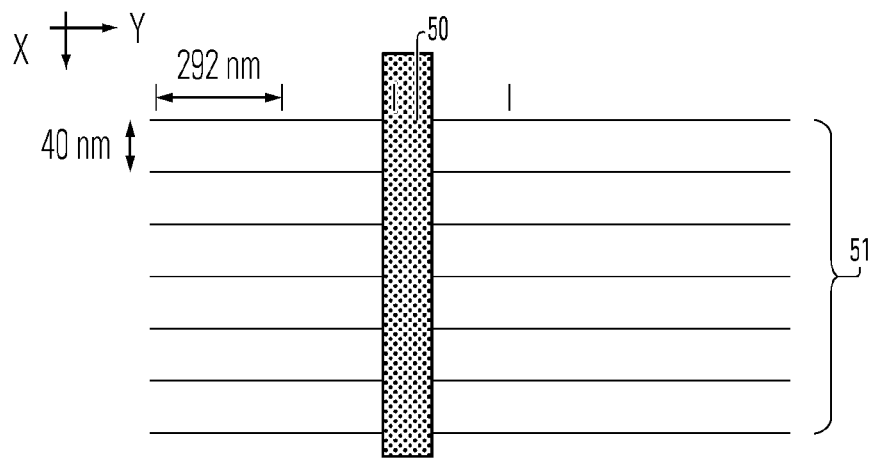
FIG. 5 illustrates the principal measuring technique of a vertical bar according to the invention.

A comparison of the situation in Y-direction is illustrated in FIG. 5. Here you are scanning a bar 50 with the same length in Y-direction. The resolution in Y-direction in each scan 51 is 292 nm but you retrieve 7 scans over the same length of the bar.

If we separate the problem we can say that in one scan we can resolve a pixel with the resolution 40 nm in X-direction and 290 nm in Y-direction.

The Algorithm.

So far we have described the main principle in Y and X direction. We have rotated the problem in Y 90 degrees to X. In Y-direction we have two processes that are random relative each other, the measurement clock and the SOS (or any correlated signal to SOS). In X-direction the measurement clock corresponds to the SOS signal and the reference is the lambda/2 signal. Also these signals (or processes) are uncorrelated. We have different resolution in the different directions but it turns out that the accuracy is almost the same.

Figure 6:
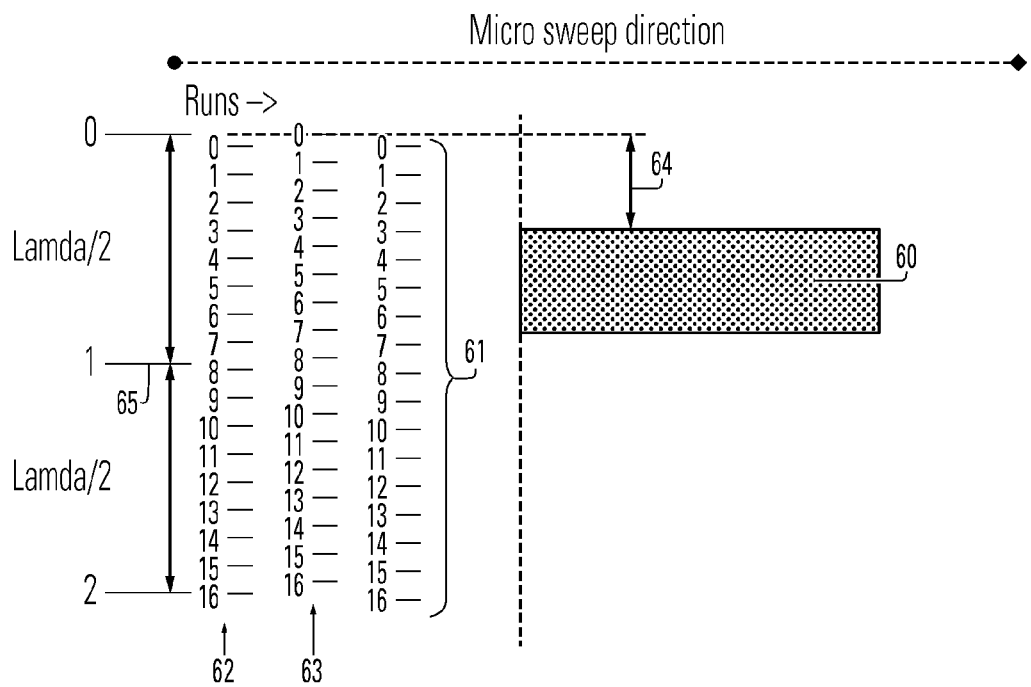
FIG. 6 illustrates the preferred method to obtain X-coordinate using a sweep in Y-direction according to the invention.

In FIG. 6, the principle of how to get the X-coordinate of a bar 60 is described. In FIG. 6 we see a bar 60 that is parallel with the ruler and micro sweep direction. The reference signal is the lambda/2 positions. In each lambda/2 interval we scan the pattern 61 with the micro sweep (our ruler). The movement over the pattern in X direction is performed with a much lower speed compared to the speed used when exposing a pattern. In this example we get about 8 scans 61 in the lambda/2 interval. If we now start to count SOS in the interval we will have a very similar situation as described above. If we count the total number of scans in the interval this will be a measurement of the speed in the interval. Since we cannot assume that the speed is the same in all the intervals it is important to do this speed calculation in order to get the correct "weight" of an event in the interval in X-direction. In this example we will get a Y-event (a transition from glass to chrome) when we have counted two SOS in the first run 62, three in the second 63 and so on. So just adding the "index" of the event inside an interval and divide this number with total number of SOS in the interval will give us an estimation of the X-coordinate of an event inside a certain interval. Above we will get the approximate position of the first Y-event after three runs over the mark to be (2+3+2)/3=2.3 SOS tics in the interval. To calculate what this corresponds to in nanometers we just multiply this number with the local resolution.

Here we get 2.3*316/8=92.2 nm. This is the local coordinate 64 for the edge of the bar 60 in the first interval. The local resolution depends on the speed, i.e. total number of SOS in the interval. If we can run the system more slowly this resolution will be better. But you will also gain resolution by scanning the bar in several runs. Below, the accuracy of the average position estimation is discussed.

As can be seen from above discussion we actually can calculate the X-coordinate from data retrieved from a scanning sweep in Y-direction. What we do is using the fact that we know exactly where we are in X-direction every time we pass an interval border 65. Inside an interval we only must assume that the speed is constant. This of course does not mean that the speed needs to be constant over all intervals. In practice we run several times across the pattern in both directions and record the Y-events and lambda/2 positions simultaneously. We therefore have the possibility to calculate the local speed with high accuracy by using information from all the runs.

The method described above is suitable to be used in either a laser lithography system or an e-beam lithography system.

Filtering

What we really are after is not the exact position of an individual pixel. The discussion so far has lead us to that the position accuracy of a single pixel depends of how many times we have recorded the pattern and the resolution we use during the recording. If we scan the pattern a certain number of times we can "select" the accuracy we want before hand. This can be done since we have full control over the measurement process. When we do this "accuracy" selection we also must consider our cursors. As have been mentioned before a cursor is just another way to define number of pixels to use for calculating an average value.

There are many ways to apply a filter to this kind of data. An obvious way might be to fit a line using standard regression techniques. These techniques works but does not generates the optimum result in this case. The main reason is that the pixel data we handle does not describe a Gaussian distribution. We have a more or less rectangular distribution to deal with. When using a regression technique we therefore will "over weight" pixels close to the border of a lambda/2 interval or the tm interval in the Y-case. A much better method to use is the more simple "area" estimation method. This method is also more accurate for this kind of data compared to the regression technique. To fit a line to an edge you just divide the database in two half's. In this case the data you have is x,y coordinates. You calculate the average value of all coordinates in each half. This way you will get two x,y points. These two points describes the line to be used in further calculations.

Some Real Results

Figure 7:
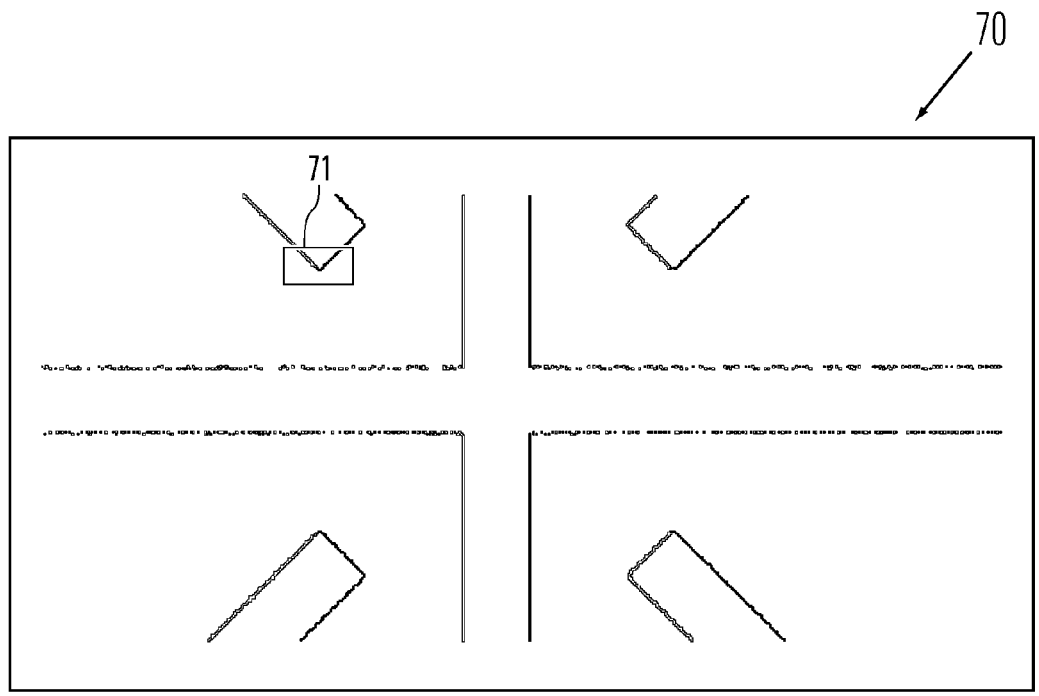
FIG. 7 shows an image obtained by using the method according to the present invention.

In FIG. 7 we have filtered the data using the above described algorithm. So far we have not applied any cursors. Only the average locations of the pixels have been calculated. The image 70 shown has been built from four runs over the mark.

Figure 8:
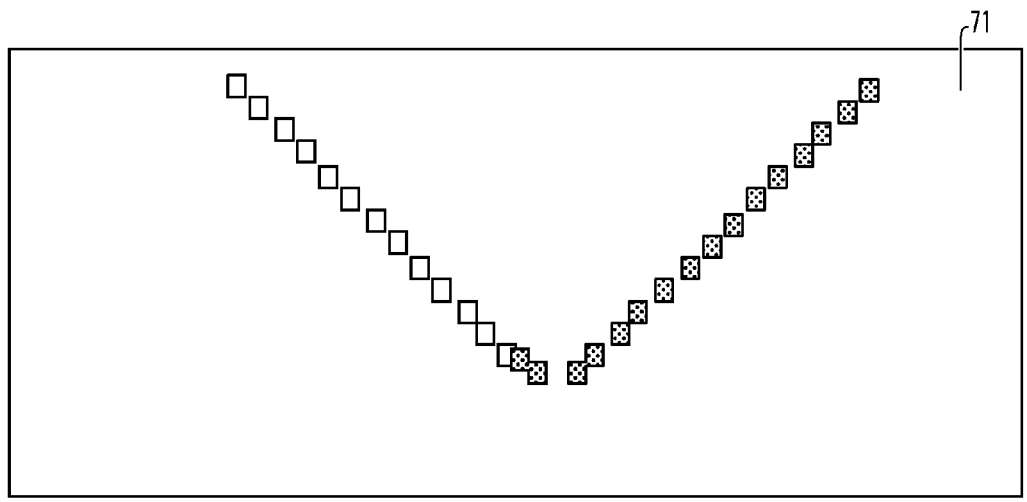
FIG. 8 shows an enlargement of the image in FIG. 7.

The small square 71 in the image 70 is enlarged in FIG. 8. Here we have used the algorithm and some filtering in order to "sharpen up" the data. Each pixel in this image is a result of all four runs over the pattern.

Cursors

Figure 9:
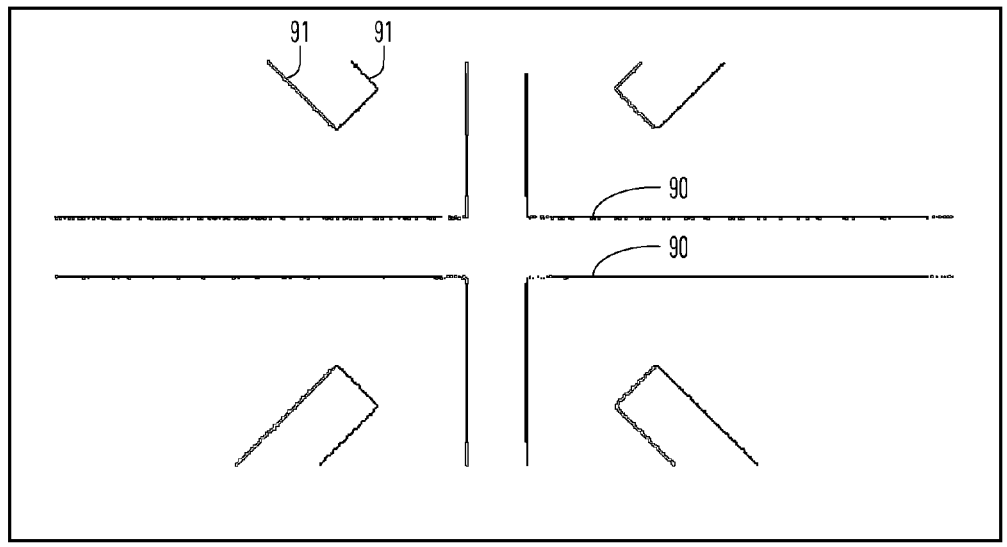
FIG. 9 shows cursors applied to the image presented in FIG. 7.

We now will apply cursors to the data in order to measure the CD and center of gravity position of the cross. The center of gravity of the cross is measured using four cursor pairs. These cursors are shown in FIG. 9.

Each line 90, 91 of the cursors is calculated based on the data from the edge in the cross. The line is calculated by using the simple "area" estimation method described above.

Figure 10A:
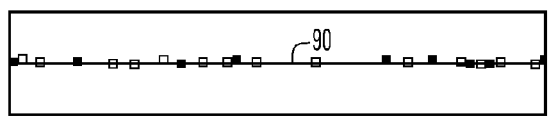
FIGS. 10a and 10b show expanded views of the cursors in FIG. 9.
Figure 10B:
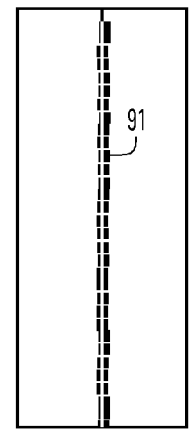

In FIGS. 10a and 10b, a part of an X and Y bar is expanded.

FIG. 10a shows a part of the upper left edge. The calculated cursor is an accurate estimation of the position of the edge in X-direction.

FIG. 10b is a part of the upper right edge of the cross. The position of this line 91 defines the edge position in Y-direction.

Figure 1:
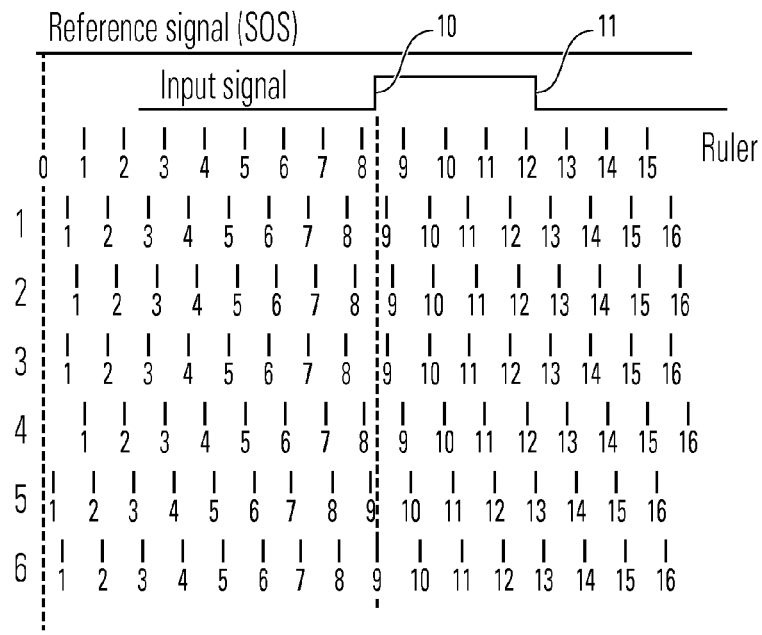
FIG. 1 illustrates the method for measuring time in the same direction as the micro sweep according to prior art.

The reason for the mixture of white and black pixels along the Y-bar in FIG. 1a can be explained. The hardware has, in this example, a limitation in that it can only re-trig on an event after two clock periods of the measurement clock. This means that if we have a positive and negative transition inside this time period we will miss one of the events. This is one of the reasons that the pixels are a bit spread in Y-direction. Then because of the noise the hardware will trig randomly on a negative or positive transition. This is actually no problem due to the fact that if we have a positive or negative transition is not so important information. What counts is where the transition occurs. To know the "direction" of the edge we can use several transitions or other kinds of logic decisions to know which type of transition we have.

In below table the center of gravity and the CD is presented for the cursors. Below table shows the result of the four cursor pairs separately.

| File: f_d_f_0602_105508.sd Hw cursor: 99.22 um | | | | | |
|---|---|---|---|---|---|
| Y-cursor 0 | | | | | |
| X0 (um) | Y0 (um) | X1 (um) | Y1 (um) | Centre (um) | CD (um) |
| 38.843 | — | 53.380 | — | 46.111 | 14.537 |
| Y-cursor 1 | | | | | |
| X0 (um) | Y0 (um) | X1 (um) | Y1 (um) | Centre (um) | CD (um) |
| 53.348 | — | 38.789 | — | 46.069 | 14.558 |
| X-cursor 2 | | | | | |
| X0 (um) | Y0 (um) | X1 (um) | Y1 (um) | Centre (um) | CD (um) |
| — | 100.648 | — | 115.106 | 107.877 | 14.458 |
| X-cursor 3 | | | | | |
| X0 (um) | Y0 (um) | X1 (um) | Y1 (um) | Centre (um) | CD (um) |
| — | 100.690 | — | 115.128 | 107.909 | 14.439 |

The center position of the mark (Xcenter,Ycenter) may be calculated as the average value of the Y-cursor center values (Xcenter) and the X-cursor values (Ycenter).

Second Order Effects.

So far we have discussed the main principles of the algorithm. We will now discuss two vital corrections that must be done on the data that are second order effects from the method.

First we need to correct for an eventual azimuth angle in the data. If we use a writer (as done in this case) we have a pre-misalignment between the X-movement direction and the ruler. This angle $\alpha$ can be expressed as:

$$\alpha = a\tan\left(\frac{vx}{vy}\right)$$

Where vx is the exposure speed of the system and vy is the speed of the micro sweep.

This angle calculation can be reduced to the expression:

$$\alpha = \frac{\text{Number\_of\_beams}}{\text{Sos\_rate}}$$

Where the Sos_rate is total number of pixel clock periods between two SOS. (See below for a more thorough explanation).

Another effect that must be taken care of is the effect of the X-movement during a measurement. Also here we will introduce an "azimuth" error. Even if we run the same number of positive strokes and negative strokes we will not cancel out this error completely. The reason is that this error has to do with the difference in speed for a positive and negative stroke. For a stroke in one direction we will therefore get an error that may be expressed as an angle ($\beta$).

This angle can be expressed as:

$$\beta = \frac{xInc}{\text{speed}} \cdot \frac{1}{(\text{Sos\_rate} \cdot yPix)}$$

where xInc is lambda/2 [nm] and speed is total number of start of sweeps inside the xInc interval. If we divide $\beta$ with $\alpha$ we will get a relation between the angles.

$$\frac{\beta}{\alpha} = \frac{xInc}{\text{speed}} \cdot \frac{1}{(nbeams \cdot yPix)}$$

If we put in some realistic numbers, xInc=316 nm, Speed=8 Sos/interval, nbeams=9 beams and yPix=250 nm, we get:

$$\frac{\beta}{\alpha} = \frac{316}{8} \cdot \frac{1}{(9 \cdot 250)} = 0.0175$$

If we calculate the error generated by $\alpha$ on a distance of 100 um we will get:

alpha_error=100*9/1435=0.6272 μm. (The Sos_rate is taken from TFT3 system parameters). Since the $\beta=0.0175*\alpha$ we can calculate the error generated by the fact that we are moving during measurement to be:

0.0175*627.2 [nm]=11 nm. This is a quite large error that cannot be neglected. This error will change sign depending of the direction of the measurement. If we measure during the same number of positive and negative strokes and the local speed is the same for both strokes this error will be cancelled out completely. In practice this is not the case. We will therefore get a small net-error due to this fact.

Figure 11:
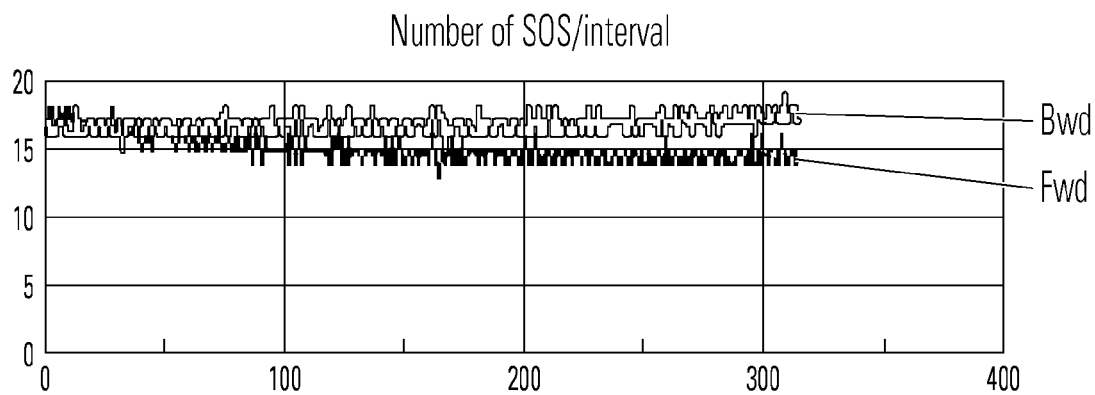
FIG. 11 shows a graph illustrating the average speed for a measurement.

In the graph shown in FIG. 11, the average speed is presented for a measurement. 2 Forward strokes and 2 backward strokes were used. The hardware cursor was 99.22 um (314 lambda/2 intervals). As can be seen there is a significantly difference in local speed for the forward and backward stroke.

Random Phase Measurement

Figure 12:
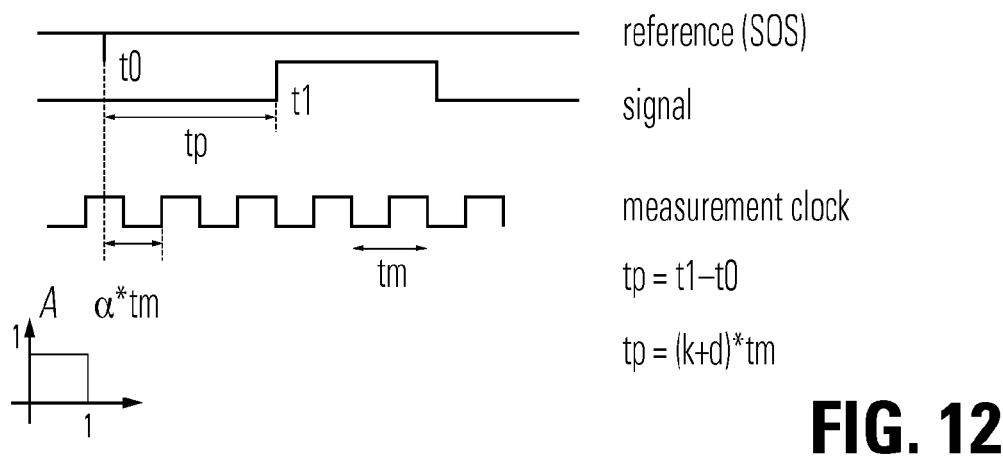
FIG. 12 illustrates the statistic principle behind random phase measurement as is used in a preferred embodiment according to the invention.

When using a random clock for measurement we shall see this as a statistical problem. In FIG. 12 the measurement situation is illustrated. What we want to measure is the time tp that is the difference between t1 and t0. The signal is synchronized with the reference signal.

We re-write the time tp as:

$$tp = (k+d) * tm$$

Where k is an integer number and d is the decimal part of tm. If we do this d will be a number in the interval [0, 1[. It will be shown later why this is a reasonable expression to use for tp.

We now introduce the measurement clock with a phase that is random relative the reference signal. We also introduce a counter that counts the positive going flanks of this clock. If we reset this counter with the reference signal we realize that we sometimes will count k flanks and some times k+1 flanks. No other counts are possible. We introduce the discrete stochastic variable K that in this way can get two values k and k+1.

We now look in FIG. 12 and introduce another stochastic variable, A which describes the phase of the clock relative the reference signal. A sample point of A (∂) will be a number in the interval [0, 1[. A is a continuous stochastic variable.

In FIG. 12 we can see the following important facts:
If ∝>d then the sample point of K will be k.
It ∝<d then the sample point of K will be k+1

What we now must do is to calculate to probability for the sample point k and k+1. To do this we must use the frequency function shown in FIG. 12 above. Since all phases have the same probability this is a rectangular distribution function.

We have:

$$P_{k+1} = \int_0^d F(t)dt = d, (\alpha < d)$$

$$P_k = 1 - d \ (\alpha > d)$$

So the probability that we get the sample point k+1 out from K will be d and the probability that we get the sample point k out of K is (1−d).

When we add the clock counts for each measurement and then divide with n we actually is estimating the average value for the stochastic variable K.

The estimated mean value may be expressed as:

$$E(K) = \sum_{-\alpha}^{\alpha} k \cdot p(k)$$

Here we have only two possible sample points so we get:

$$E(K) = k \cdot (1-d) + (k+1) \cdot d = k + d$$

So when we rescale this result to nanoseconds we get $$(k+d) \cdot tm = tp.$$

This result proves that building the average value of the counter tics and scale this value with tm will give us the time we are after.

The Sigma

To calculate the accuracy of the average value E(K) we need to find the variance of K.

The variance of a distribution may be expressed as:

$$V(K) = \sum_{-\alpha}^{\alpha} (k-m)^2 \cdot p(k) \quad (1)$$

This can be re-written as:

$$V(K) = E(K)^2 + [E(K)]^2$$

We get:

$$V(K) = k^2 \cdot (1-d) + (1+k)^2 \cdot d - (k+d)^2 = d \cdot (1-d)$$

and $$D(K) = \text{sigma} = \sqrt{d \cdot (1-d)}$$

The variance function is actually very interesting. We see that if d=0, that means that we have no decimal part V(K)=0 we also see that if d is very close to 1, V(K)=0. Actually the variance has its maximum when d=0.5. In this case the variance is 0.25. The sigma will therefore be 0.5 as its maximum.

To interpret this you may think as follows. If d is 0 we always will count k ticks from the counter. Here we also assume that we count one tick if the positive going edge from the clock coincides with the reference signal. Since we always is counting k ticks independently of the phase of the measurement clock the spread also from the average value will be zero since variance is a measurement of the squared distance from the estimated average value. (Please refer to equation 1 above).

What is then the physical meaning of this?

Let us first make a practical example.

If we measure a signal with the decimal part 0.01 and k=2 the probability of counting a 3 in a measurement will be 0.01. This probability is the same for each measurement. Now if we calculate the average of 100 measurements we will probably add 99 samples of 2 and one sample of 3 (Case 1). But it is also possible that we add 100 samples of 2 and no samples of 3 (Case 2). The error we actually have in the average value is then:

$$\frac{0.1 \cdot (1-0.1)}{\sqrt{100}} = \frac{0.09}{\sqrt{100}} = 0.009$$

So after 100 measurements in case 1 we will get:

$$\frac{99 \cdot 2 + 1 \cdot 3}{100} = \frac{201}{100} = 2.01 \pm 0.005,$$

and in case 2: 2.00+/−0.005

There is another very interesting way to see the physical conclusion of the case when d=0.

Assume that we want to measure a signal that is exactly k*tm. In this case the decimal part is zero. Now if we add counter ticks we must always count k ticks. Otherwise, and this is important, we should never get the correct average that is k in this case. In other words we cannot ever count k+1 ticks. If this would be the case the average we calculate would not be k. For this reasons the variance must be zero. Please note that only two numbers can generally be counted, k and k+1. So the value k−1 can never be counted. So in other words a count that is k+1 cannot be compensated by a value k−1 so we get the correct average anyway.

Since we do not know tp beforehand we should use the worst-case scenario when we estimate the error. In other words we shall say that the error due to the method is:

$$\text{Error}(K) = 0.5 * tm [ns].$$

This is as shown above the maximum of the function $d*(1-d)$. If we want to use a symmetrical error instead we can express the method result as:

$$tp = ((k+d) \pm 0.25) \cdot tm [ns]$$

The error in the method will go down if we use a large number of measurements. We can express the error as:

$$\text{measurement\_error} = \frac{1}{\sqrt{n}} \cdot 0.5 \cdot tm \ [ns]$$

This expression can be scaled to nanometers as:

$$\text{Error [nm]} = \frac{1}{\sqrt{n}} \cdot 0.5 \cdot rs \ [nm],$$

where rs is the actual resolution for the actual direction. If we put in some numbers, rs=291 nm in Y-direction and rs=40 (316/8) nm in X-direction. So the error in the estimation of a pixel position in X or Y direction may be approximated to be:

$$Y_{Error} = \frac{1}{\sqrt{n}} \cdot 145 \ [nm]$$

$$X_{Error} = \frac{1}{\sqrt{n}} \cdot 20 \ [nm]$$

The Azimuth Angle

Figure 13:
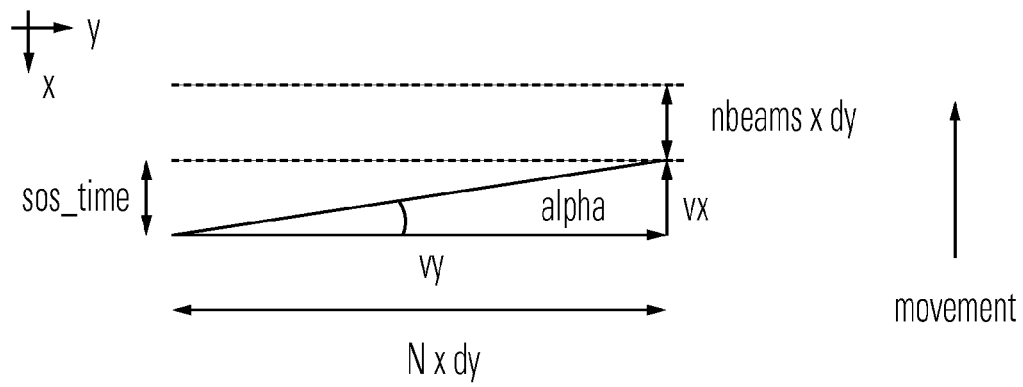
FIG. 13 depicts an exposure case.

In FIG. 13 the exposure case is illustrated. Between two start of sweeps we moves the distance nbeams*dy [um] in X-direction. dy is the pixel size. We here assume a square pixel. In the same time we move N*dy [um] in Y direction.

The angle alpha ($\alpha$) may be expressed as atan (vx/vy). If we calculate this angle we get:

$$\alpha = \text{atan}\left(\frac{nbeams * dy / \text{sos\_time}}{dy / \text{pixel\_clock\_time}}\right)$$

The sos_time may be expressed as N*pixel_clock_time. N is here the total number of pixels between two start of sweeps. Finally we therefore can express the angle alpha ($\alpha$) as:

$$\alpha = \text{atan}\left(\frac{nbeams}{N}\right)$$

Please note that this angle is a constant "compensation" that preferably is removed from the database.

The invention claimed is:

1. A method for determining coordinates of an arbitrarily shaped pattern on a surface in a deflector system, including:
  a) selecting a reference clock signal that defines a movement in a first direction (X),
  b) providing a micro sweep that repeatedly scans the surface in a second direction (Y), perpendicular to the first direction (X)
  c) selecting a measurement clock signal that is related to the signal used to start each micro sweep in the second direction (Y),
  d) adjusting the speed of the movement in the first direction (X) to determine the distance between the start of each micro sweep,
  e) performing a first run that include the steps of:
    e1) starting a first micro sweep at a starting position,
    e2) detecting at least one edge of the arbitrarily shaped pattern when the pattern is moved in the first direction (X) relative the deflector system,
    e3) generating at least one event if the edge of the pattern is detected, and
    e4) counting using a counter the number of micro sweeps performed until each event is generated, and
  f) calculating a coordinate of the edge, for each event, in the first direction (X) using the number of performed micro sweeps wherein more than one run as defined in step e) is performed, for each run the starting position in step e1) is pseudo randomly selected, thereby generating pseudo randomly distributed micro sweeps between each run.

2. The method according to claim 1, wherein an average value of the edge is calculated in step f), thereby increasing accuracy of the coordinate in the first direction.

3. The method according to claim 1, wherein said the selected reference clock signal in step a) corresponds to a known position of the system in the first direction (X).

4. The method according to claim 3, wherein said selected reference signal in step a) is divided into intervals, where each interval corresponds to a lambda/2 period of the reference clock signal, and the selected measurement clock signal in step c) has a period that corresponds to 8-10 scans of the pattern in each interval.

5. The method according to claim 4, further including determining a coordinate in the second direction (Y) using as a reference signal, the signal used to start each micro sweep in the second direction, and as a measurement signal, a pixel clock signal.

6. The method according to claim 1, wherein the method further includes a compensation for an azimuth error introduced when the micro sweep scans the surface in the second direction (Y) during movement of the surface in the first direction (X).

7. The method according to claim 6, wherein said compensation is a constant compensation.

8. The method according to claim 1, further including determining a coordinate in the second direction (Y) using as a reference signal, the signal used to start each micro sweep in the second direction, and as a measurement signal, a pixel clock signal.

9. Software fixed in a non-transitory computer-readable storage medium, adapted to be used in a deflector system for determining the coordinates of an arbitrarily shaped pattern in a deflector system, the software further adapted to carry out the method of claim 1.

10. A method for determining coordinates of an arbitrarily shaped pattern in a deflector system, including:
  moving the pattern in a first direction (X), calculating the position of the edge of the pattern by counting with a counter the number of micro sweeps, performed in a perpendicular direction (Y), until the edge is detected, and determining the coordinates by relating the number of counted micro sweeps to the speed of the movement of the pattern;
wherein the pattern is scanned several times and an off-set in the first direction (X) for the first micro sweep is pseudo randomly selected for each run.

11. The method according to claim 10, wherein the speed of movement of the pattern is correlated with the number of micro sweeps performed.

12. The method according to claim 10, wherein the position of the edge is obtained from an average value from all runs.

13. The method according to claim 10, wherein the pattern is scanned several times and an off-set in the first direction (X) for the first micro sweep is pseudo randomly selected for each run.

14. Software fixed in a non-transitory computer-readable storage medium, adapted to be used in a deflector system for determining the coordinates of an arbitrarily shaped pattern in a deflector system, the software further adapted to carry out the method of claim 10.

* * * * *